Sheet 1 - 2 Sheets

D. S. McNamara.

Mower.

No 74
No 1179

Reissued May. 7, 1861

Witnesses { Wm. Y. Ridgway, Wm. Dillon }

Inventor { D. S. McNamara
By his Attorney
Thos. H. Dodge }

Sheet 2. 2 Sheets.

D. S. McNamara.

Mower.

No 74
No 1179

Reissued May. 7, 1861

Witnesses { [illegible] / [illegible]

Inventor { D. S. McNamara
By his Attorney
Thos. H. Dodge

UNITED STATES PATENT OFFICE.

D. S. McNAMARA, OF TROY, NEW YORK, ASSIGNOR TO G. M. SELDEN.

IMPROVEMENT IN HARVESTERS.

Specification forming part of Letters Patent No. 21,612, dated September 28, 1858; Reissue No. 1,179, dated May 7, 1861.

DIVISION A.

*To all whom it may concern:*

Be it known that I, DAVID S. McNAMARA, formerly of North Hoosic, New York, but now of Troy, in the county of Rensselaer and State of New York, have invented certain new and useful Improvements in Grain and Grass Harvesters; and I do hereby declare that the following is a full, clear, and exact description thereof, reference being had to the accompanying drawings, forming a part of this specification, and in which—

Figure 1:
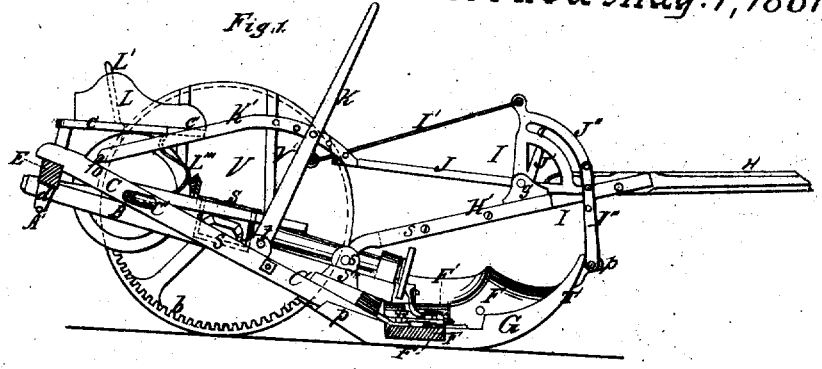
Figure 2:
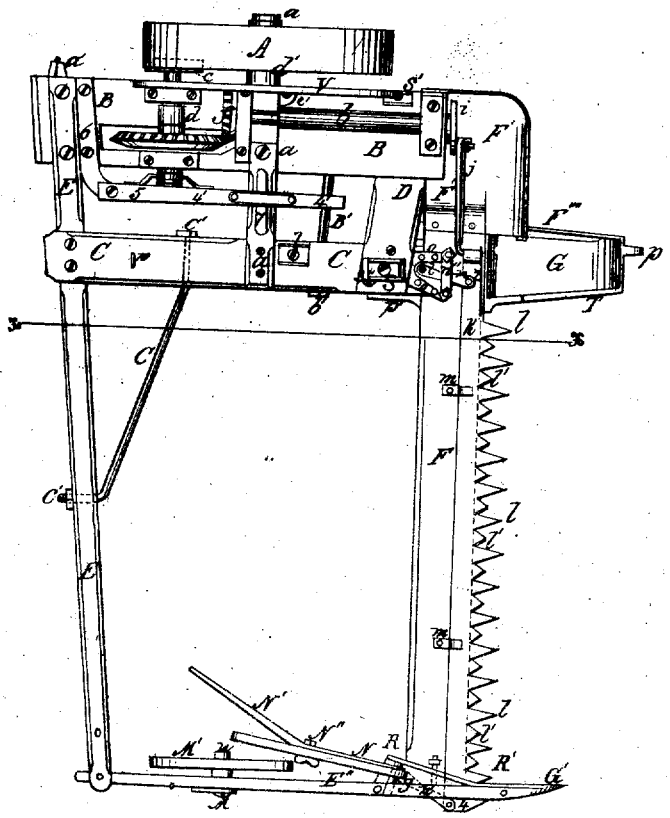

Figure 1 represents a section on line *x x*, Fig. 2. Fig. 2 represents a plan or top view of the machine, with the seat, tongue, and levers for raising the cutting apparatus removed in order to show the frame-work more fully. Figs. 3, 4, 5, 6, and 7 represent views of certain parts of the machine detached.

The main frame of the machine is composed of pieces B, C, D, and E, the latter extending out in an elevated position in rear of the finger-beam F, as indicated and shown in Figs. 1 and 2.

The side of the machine which runs next to the standing grass I call the "inside" of the frame, while that next to the cut grass or grain, and by the side of which the main wheel runs, I call the "outside" of the frame.

The construction of the main frame is such that the rear of the frame, together with the front outer corner thereof, is elevated above the ground, while the front inner corner is depressed down near to the ground. This is effected by fastening piece E to the top of B while piece D is fastened to the under side of B and to the top of C, the rear of the latter being fastened to the top of E. In this way the front end of C is inclined down, as fully shown in Fig. 1. It will also be observed that the pieces D and E converge toward each other as they extend from the piece B, so that after being fastened to piece C a frame of great strength is produced, owing to the bracing position of the parts D and E. By this arrangement the frame can be made quite light, and yet be of sufficient strength to resist great strain in practical operation. To give greater strength to the frame a truss-rod, B′, is passed through pieces B C, with an adjusting-nut, *b′*, applied to each end, only one of which is seen in the drawings, whereby the frame can be tightened up very quickly. The rear piece, E, is also provided with a truss, C′, with adjusting-nuts *c′ c′*, as fully shown in Fig. 2. It is also provided with another truss, A′, which is fastened near its inner end, and then extends underneath a bridge or pendant-piece, *a″*, (attached to the under side of the piece E,) through the rear end of B, where it is provided with an adjusting-nut, *a′*, as fully shown in Fig. 4, which is a rear view of pieces B, C, and E, and seat L, with its elliptical spring L″ and shield-piece V, attached to the upper outer edge of the main frame, to prevent the driver's feet from getting into the main gear-wheel.

Figure 5:
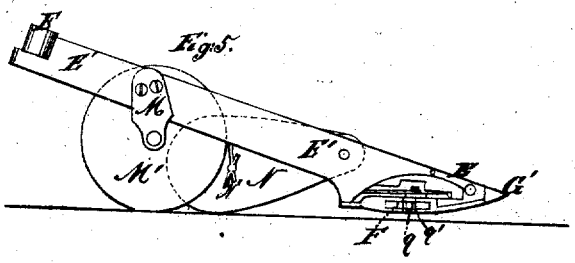
Figure 4:
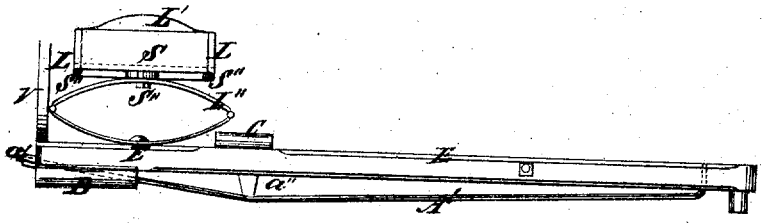
Figure 3:
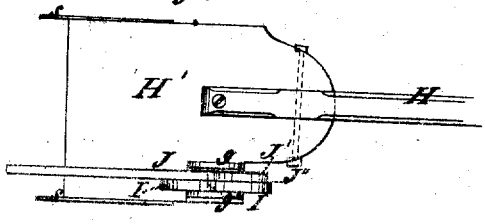
Figure 7:
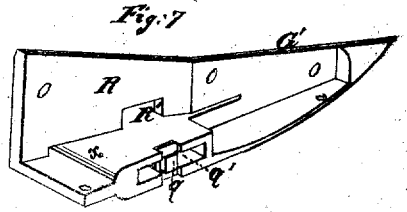
Figure 6:
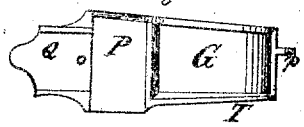

A strong metallic shoe, G, is cast or otherwise formed with a recess, P, on top, for the reception of the heel of the finger-beam, and also a similar one, Q, for the reception of the front end of C, as seen at *p′*, so that when the finger-beam and piece C are placed in position and bolted to shoe G a firm and strong connection is formed between the heel of the finger-beam and main frame, while the finger-beam and shoe are supported close down to the ground, upon which the shoe G generally rests when in operation. The inner end of the finger-beam has a tenon cut thereon, which is passed through a corresponding mortise or hole formed in a metallic shoe, G′, and then a bolt, *q*, is passed into a hole in the end of the tenon of the finger-beam until it reaches a nut let into the top of the finger-beam, as shown in Fig. 2, when it enters said nut, and as it is screwed up causes the shoe G′ and the finger-beam to be closely and firmly united. It will be best to slip a piece of metal on the bolt *q* before putting it in place, so that when well up the metal will rest against the shoe, and thus enable a bolt with a small head to be used, as seen in Figs. 5 and 7, where *q′* represents the extra metal piece. Then again, it may sometimes be best to leave a recess in the shoe for the metal piece to slip into, in order to keep it from turning when the bolt-head begins to press hard upon it. (See Fig. 7, where shoe G′ is shown detached and enlarged, in order to illustrate its peculiar construction more fully. Bolt *q* and metal piece *q′* are both shown in this figure.) The outer end of the finger-beam F is further strengthened by an end piece, E′, which is firmly connected to the inner end of E, and also to shoe G′, the former being cast with recesses and projections, whereby the parts can be securely fastened together by bolts both in front and in rear of the finger-beam, as shown in Figs. 2, 5, and 7. To end piece, E′, is fastened a hanger-piece, M, having a projecting stud or stationary journal, *w*, upon which a small supporting-wheel, M′, turns.

Between the end piece, E′, and projection R of shoe G′ is hinged a tracker-piece, N, provided with a curved slot, in which work a set-screw and nut, N″, for the purpose of adjusting the bent iron tracker-piece N′ at different elevations from the ground, upon which the piece N rests when the machine is in operation. The object of this tracker device is to throw the cut grass toward the machine, so as to leave a clear or unobstructed space for the shoe G and the heel of the finger-beam on the next round. The bent iron piece N′, in addition to performing the function of throwing the cut grass toward the machine, answers the further office of supporting and sustaining the part N, which is often or generally made of wood. This is effected in consequence of the front of N′ being hinged to the same bolt or journal-piece as N, whereby, when set-bolt and screw N″ are turned up, the parts N and N′ are rigidly secured together, so that any strain on N calculated to split the front, where it is hinged, will be resisted by the iron part N′. In other words, when the parts are fastened together by set-bolt N″, which passes through both, the strain due to drawing part N is borne by the front of N′, while the strain upon N is transferred to its center, where it is not liable to split out.

The machine is supported upon two wheels, A M. The former, being the main drive-wheel, is provided on its inner periphery with a gear, *b*, which works into gear *c* on the end of shaft *d*, which is arranged to turn in suitable bearings on the main frame, as indicated clearly in Fig. 2. Near the center of shaft *d* is made fast a bevel-gear, *e*, which works into a bevel-gear, *f*, on the rear end of crank-shaft *h*, which turns in suitable bearings arranged on top of the frame, as shown in the drawings.

To the front end of the crank-shaft *h* is fastened a balance-wheel, *i*, which runs just clear of the front outer corner of the main frame, and from which projects the crank-pin which operates the pitman *j* and sickle *k*, the latter being provided with cutters *l l′*. The sickle *k*, with its cutters *l l′*, is arranged to work on the front edge of the finger-beam, and instead of a simple reciprocating motion, as is usual in harvesters, it has a combined reciprocating and curvilinear motion. This combined motion is effected by attaching or hinging the sickle *k* to arms *n n′*, the arms *n n′* being in turn hinged at their other ends, *n*, to a pivot rising up from the rear of the metal shoe G, and *n′* from a pivot up from the rear of the metallic shoe G′. In order to keep the sickle down properly in place, arm *n* works under an iron strap or guide-piece *n″*, which is bolted to the top of the forks *o o* of a metal piece fastened to the front of piece C of the main frame. The outer end of the sickle is kept in place by working through an opening in shoe G′ just under the part R. This opening is enlarged where the pivot-head of arm *n′* comes, as seen at R′, in order to prevent all danger of said head striking against the shoe when the sickle is in operation. Arm *n* is pivoted at 1 2, and arm *n′* at 3 4.

Guide-pieces *m m* may also be fastened to the finger-beam and allowed to project over the sickle. The axle *d* of the main wheel A is stationary, and is made fast to the top of the main frame, as indicated in the drawings.

On the under side of the stationary journal-piece *d* shoulders are cast, which fit on each side of the piece B, and also against the side of C next to B, whereby the parts, when bolted together, are rendered firm and strong. Journal-piece *a* has ears cast upon it, one of which is seen at *e′*, for the purpose of facilitating its attachment to the piece B. The outer end of journal-piece *a* is turned up like a crank at *d′*, for the purpose of allowing the frame to be as near to the ground as desirable while using a wheel of large size. The journal-piece *d* is also hollowed out where the crank-shaft passes over it.

The machine is thrown in and out of gear, as follows: Lever 4′ is pivoted to the end of a metal piece, 6, so that its front end can move back and forth in a horizontal position. It is also provided with a staple or ring piece, 8, which encircles the journal-piece *a*, and with two catch-pieces, 5, which fit into a groove cut in the end of shaft *d*, whereby when the driver pushes the front of the lever 4′ toward the standing grass, shaft *d*, together with its gear *e*, is caused to move in that direction, and gears *e* and *f* are thrown out of action. When the driver wishes to put the cutter into operation again, he moves lever 4′ in the opposite direction, whereby gears *e* and *f* are brought into action again.

In order to prevent the gearing from being thrown out of action by the jarring of the machine, a curved spring, 7, is attached to the under side of lever 4′, so that its ends will rest on and slide upon journal-piece *a*, whereby lever 4′ is kept up, so as to cause its staple-piece 8 to fit into a notch cut in the bottom of journal-piece *a*. Spring 7 yields to the downward pressure of the driver's hand or foot upon lever 4′, whereby staple 8 is forced down out of its notch whenever the gearing is to be thrown out of action by a lateral movement of lever 4′.

L is the driver's seat, supported by two springs—a rear elliptical spring, L″, fastened to piece E, and a front bent spring, L‴, fastened to the top of piece B. The springs are not fastened directly to the seat, but to a cross-piece composed of a central piece, S, and a front cross-piece, S′. The piece S is slotted out, so as to allow of seat L being moved forward or back, as may be desired, without removing bolt S″, which passes through the bottom of seat L, and thence through the slot in piece S, having a nut on its lower end, whereby seat L can be held in any desired position. The box of the seat has a division or backboard, L′, the space back of said board being used as a tool-receptacle.

V is a guide or shield piece supported by standards *v′ v′*, attached to the outer side of piece B. It will thus be seen that the driver's limbs are not liable to be caught in the main gear-wheel.

In order to bring the pieces *s′ s′* on a level, the inner one is supported on a piece, *s′*, fastened to the top of the depressed end of piece D.

When the machine is in operation, its weight is so arranged that it preponderates slightly in front, thus keeping shoe G to the ground. The front of shoe G curves up like a runner, as shown at T, and is provided with a projection, *p*, to which one end of an adjustable link-piece, I″, is connected or pivoted, while the other end of I″ is connected to one arm of a lifting-lever, I, turning on a fulcrum, *g*, attached to and supported by the rear of the tongue. The other arm of lever I is vertical and at right angles, or nearly so, to the first, and is connected to hand-lever K, whose lower end is pivoted or hinged to the main frame at *t*, while a stop-piece, K′, hinged to the frame at 10, passes through lever K, so that as said lever is drawn back it can be held in any desired position by simply passing a pin through a hole in stop K′ just in front of lever K″. The object of this lifting device is to enable the driver to elevate the cutting apparatus at pleasure, and to pass over obstructions, cut grass, or from one field to another, which he can readily do by simply taking hold of lever K and drawing it back, when the vertical arm of lever I, pivoted to the tongue or a piece attached thereto, will be drawn back, while its other or horizontal arm will be elevated, thereby raising shoe G, together with the cutting apparatus, whose weight thus raised will be suspended from the rear of the tongue.

It sometimes happens that in heavy grass it requires considerable power to elevate the cutting apparatus, and therefore in order to assist the driver a foot-lever is pivoted on the same center as lever I, with a long arm, J, extending back within reach of the driver's feet, so that the driver by pressing arm J with his foot can cause its short arm J′ to turn back, whereby the small projection J″ on the end of arm J′ is brought back against the end of the curved slot in I, whereby shoe G and the cutting apparatus are elevated, as before stated. It will thus be seen that the driver can use his hands or his feet, or both, to elevate the cutting apparatus, as the occasion may require. When the cutting apparatus is raised, the frame oscillates on wheels A and M. It will also be observed that lever K can be so adjusted as to allow shoe G and the cutting apparatus to descend into slight depressions in the ground, but prevented from falling into deep gullies over which the team has passed. For instance, suppose the team has passed a deep gully, when the cutting apparatus reaches it a slight fall of the same is all that occurs, for lever K is held by stop K′, and consequently the cutting apparatus is sustained by the tongue, the front end of which is supported by the necks of the horses.

In order to strengthen and support the finger-beam more securely, a metal finger-beam extension-piece, F′, is fastened to the top of the heel of the finger-bar, or to the shoe which supports it, and then rises up and extends along so as to be fastened to the under front outer corner of the main frame just under the balance or crank wheel. The part in front of the balance-wheel is wide, and curves up, as seen at F″, so as to protect the crank end of the pitman from catching cut stalks of grass.

A piece, F‴, may be fastened to shoe G to assist in supporting one corner of the wide part F″, if preferred.

Any convenient known forms of fingers may be used in connection with the cutters.

The different pieces composing the main frame are provided with proper shoulders where they are united, in order to make good joints. The grass, as it is cut, falls back over the finger-beam onto the ground, the tracker giving that portion which falls upon it an inclination toward the main frame, as and for the purposes heretofore described.

If the machine is to be used to cut grain, then a platform must be laid upon the finger-beam, and be otherwise properly supported to receive the grain, the height of the finger-beam from the ground being first properly adjusted. The tracker in this case would not be required and could be removed.

By reference to Fig. 5 it will be seen that shoe G′ is so supported as to be just clear of the surface on very level ground, whereby much friction on the ground and consequent side draft are prevented.

Having thus described my improved harvester, what I claim as my invention under this patent is—

1. So constructing the main frame of a grain and grass harvester, or either, as that the rear of the frame, together with the front outer corner, will be elevated above the ground to pass freely over cut grass and other obstructions, while the front inner corner of said frame is depressed down near to the ground, to receive and support the shoe which supports the heel of the finger-beam, as set forth, and whereby the position of the driver can be placed well back of the cutting apparatus, thus enabling him to keep a constant watch over the same without danger of falling in front of the cutters should he be thrown from the machine.

2. The combination of the pieces B, C, D, and E, when arranged in relation to each other, as and for the purposes stated.

3. The combination of the truss-rod C′ with the pieces C and E, substantially as and for the purposes set forth.

4. The truss-rod B′ with the frame-pieces B, C, D, and E, substantially as and for the purposes set forth.

5. The combination, with the finger-beam F, of the pieces E E′ and truss-rod C′, or its equivalent, substantially as and for the purposes herein set forth.

6. The combination of a metallic guide-piece, $n''$, with arm $n$ and cutter-bar and pitman, substantially as set forth, whereby the heel of the cutter-bar is left free and uncovered, so as to avoid clogging, and yet is kept in place, as described.

7. The combination of stationary journal-piece $a$ with the main frame and drive-wheel, substantially as set forth, whereby the frame is not only strengthened but depressed toward the ground, although a wheel of large size is used.

8. The combination of lever 4′, spring 7, and staple 8 with journal-piece $a$ and shaft $d$, as and for the purposes set forth.

9. The combination of the cross-piece S S′ and springs L″ L‴ with seat L, constructed and arranged in relation to each other as set forth.

10. The combination of the slotted tracker-board N with the bent tracker-iron N′ and set-bolt and nut N″, substantially as and for the purposes set forth.

11. The combination of metal piece $q'$ and bolt $q$ with shoe G′ and finger-beam, as and for the purposes set forth.

12. Forming the metal shoe G′ substantially as described, and shown in the drawings, whereby the piece E can be securely fastened to its side, so as to have a support both in front and rear of the end of the finger-beam, and the inner inclined part, R, made to afford a proper support to the tracker, while the part $x$ affords an even metallic surface, upon which the arm $n'$ and end of the cutter-bar hinged thereto can vibrate when the machine is in operation.

13. Shoe G, for supporting the heel of the finger beam or bar, constructed as shown and described, whereby its union with the main frame and finger-beam is rendered simple and strong, and in such a manner as to afford a proper metallic support to the pivot of the rear end of arm $n$.

14. The curved metallic finger-bar extension-piece F′, in combination with shoe G and the front outer corner of the main frame, whereby the finger-bar is strengthened and the crank end of the pitman protected from cut stalks of grass.

In witness whereof I have hereunto subscribed my name.

DAVID S. McNAMARA.

In presence of—
JOHN M. LANDON,
JOHN H. PECK.